W. A. CONWAY.
PET COCK CONTROL FOR MOTOR VEHICLES.
APPLICATION FILED NOV. 20, 1916.
1,237,618.
Patented Aug. 21, 1917.
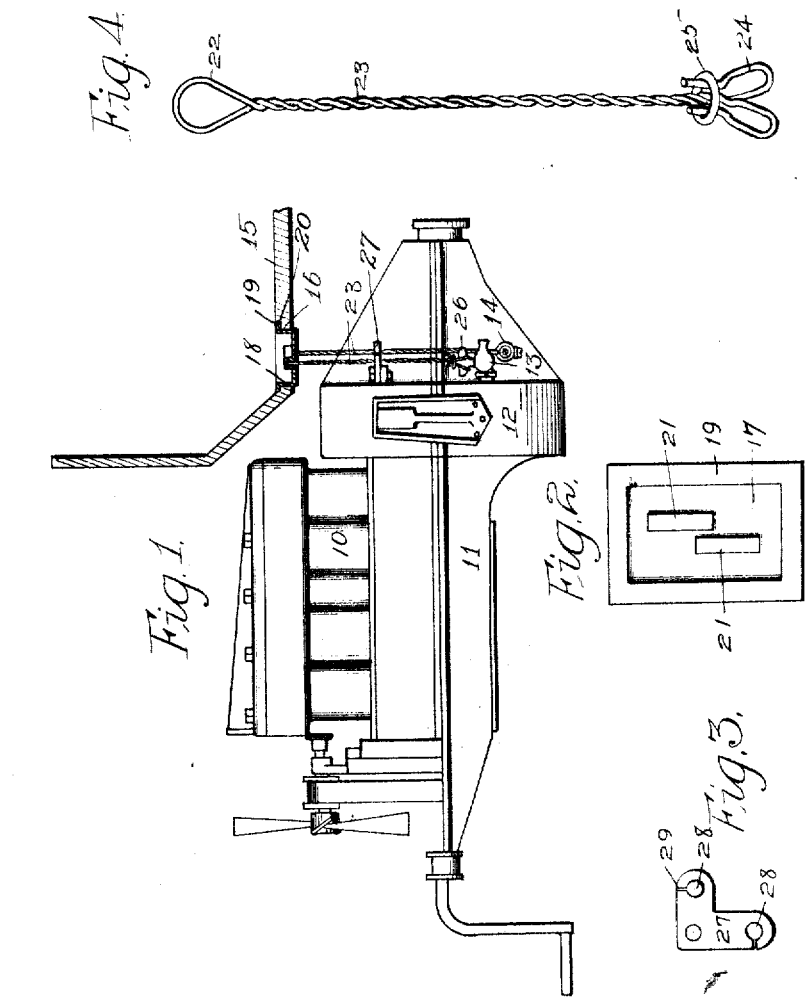

UNITED STATES PATENT OFFICE.

WILLIAM A. CONWAY, OF CONWAY, IOWA.

PET-COCK CONTROL FOR MOTOR-VEHICLES.

1,237,618.  Specification of Letters Patent.  Patented Aug. 21, 1917.

Application filed November 20, 1916. Serial No. 132,503.

*To all whom it may concern:*

Be it known that I, WILLIAM A. CONWAY, a citizen of the United States, and resident of Conway, in the county of Taylor and State of Iowa, have invented a certain new and useful Pet-Cock Control for Motor-Vehicles, of which the following is a specification.

The object of my invention is to provide a pet cock control for motor vehicles of simple, durable and inexpensive construction.

More particularly it is my object to provide means for controlling pet cocks ordinarily found on Ford cars and used for inspecting the condition of the oil in the crank casing, which device has parts so arranged that the pet cocks may be operated and inspected from the body of the vehicle without getting under the machine, and without getting out of the machine.

Still a further object is to provide a combination of an engine having pet cocks for observing the oil supply, with a floor above the pet cocks, the floor having a removable part, so arranged that the pet cocks may be observed through the opening in said floor upon removal of said removable member, said device including a device for controlling the pet cocks, accessible from above the floor, said removable part being adapted to lock said device when the removable part is in its proper position in the floor.

My invention consists in the construction, arrangement and combination of the various parts of the device, whereby the objects contemplated are attained as hereinafter more fully set forth, pointed out in my claims and illustrated in the accompanying drawings, in which:—

Figure 1 shows a side elevation of a device embodying my invention, the floor and the removable portion thereof being shown in vertical cross section.

Fig. 2 shows an inverted, plan view of the removable floor member.

Fig. 3 shows a side elevation of the bracket, and

Fig. 4 shows a side elevation of the controlling rod.

In the accompanying drawings, I have used the reference numeral 10 to indicate generally an engine of the type used on Ford automobiles having the crank casing 11, at the end of which is the fly wheel and magneto casing 12. The fly wheel and magneto casing have the pet cocks 13 and 14 arranged at different levels and adapted to be opened for observing the height of the oil.

That is to say if the user of the engine wants to determine whether he has sufficient lubricating oil he opens the upper pet cock 13. If the oil flows therefrom it shows that there is sufficient oil in the crank casing. If no oil flows from the pet cock 13, the pet cock 14 may be opened. If no oil flows therefrom, the machine should be given some more oil.

Some drivers prefer to keep the oil above the level of the pet cock 13, while others consider that they have sufficient oil if oil will flow from the lower pet cock 14.

One feature about the arrangement just described, which I believe I have improved upon, lies in the fact that it is necessary to get under the car and reach in from the side or upwardly from below the engine to operate the pet cocks 13 and 14.

By my improved device the pet cocks can be operated from the driver's seat or from above the floor 15 of the body of the car.

I cut in the floor 15 an opening 16 of any suitable shape.

In the illustration I have shown an opening rectangular in shape adapted to receive a removable closure member, comprising a substantially flat plate 17 having a circumferentially upwardly extending flange 18, at the upper end of which is a laterally extending horizontal flange 19. Around the upper part of the opening 16 is a rabbet 20 to receive the flange 19.

The plate 17 is provided with two spaced downwardly opening channels 21, the open ends of which are flush with the lower surface of the plate 17.

For controlling the pet cocks, I have provided two rods each comprising in the particular case illustrated in the drawing, a length of wire looped at its central portion as shown at 22, the two portions of the wire separated by the loop being twisted together to form a substantially straight rod 23. The ends of the wire are bent to form two spaced loops 24.

Mounted on the lower part of the rod 23 is a locking ring 25. The loops 24 receive the opposite ends of the handle member 26 of the stem of the valve, and the locking ring 25 is then pressed downwardly over the loops 24 for locking them against spreading movement in the position shown in Fig. 1.

The loop 22 at the upper end of the rod 23 projects into the opening 16.

I provide one of the rods 23 for each of the pet cocks 13 and 14.

Suitably mounted is a bracket 27 having openings 28 to receive the rods 23 and having slits 29 extending from said openings to the edges of the bracket for permitting part of the material to be bent away for admitting the rods 23 to the openings 28. The bent-away portions may then be flattened or bent to their normal positions for holding the rods 23 in the openings 28.

The parts are so arranged that when the rods are installed in position, and the pet cocks are closed, and the removable floor member is placed in position, the loops 22 will be received in the channels 21 and will be held thereby against rotation. By this arrangement the pet cocks are held locked.

This feature I consider an important part of my invention for the reason that the pet cocks, due to the vibration of the machine, will sometimes accidentally become opened resulting in the loss of oil in the crank casing.

In the practical operation of my improved device, the parts are installed in the position last described. When it is desired to open the pet cocks to determine the condition of the oil supply, the driver of the car simply removes the removable floor member and grasps the loop 22 of the rod connected with the pet cock which it is desired to open, and rotates the rod 23 for opening the pet cock.

After the pet cocks have been opened, they are closed and the removable floor member may be replaced in its proper position.

It will be seen that the removable floor member cannot be replaced in position until the rods 23 are moved to position where the pet cocks are closed.

The channels 21, therefore, prevent any accidental rotation of the rods 23 due to vibration of the machine or any other cause, until the removable floor member is lifted and prevent the rods from moving or jumping upwardly off the pet cocks during any vibration of the machine.

The advantage of being able to inspect the pet cocks and operating them from above the floor of the vehicle is obvious, and requires no elaboration.

Some changes may be made in the construction and arrangement of the various parts of my improved device without departing from the essential features and purposes of my invention, and it is my intention to cover by this application any such changes which may be included within the reasonable scope of my claims.

I claim as my invention.

1. The combination of a vehicle, having an engine and an oil chamber with a pet cock thereon, and having a floor above said pet cock provided with an opening, with an upright rod for controlling said pet cock, said rod having spaced members for receiving between them the stem of the pet cock, and having at its upper end a handle device, and a closure device for said opening having an upwardly opening channel for receiving said handle device, whereby to prevent rotation of said rod.

2. The combination of a vehicle, having an engine and an oil chamber with a pet cock thereon, and having a floor above said pet cock provided with an opening, with an upright rod for controlling said pet cock, said rod having spaced members for receiving between them the stem of the pet cock, and having at its upper end a handle device, and a closure device for said opening comprising a plate inset into said opening, having an upwardly opening channel for receiving said handle device, whereby to prevent rotation of said rod, and having upwardly extending walls with laterally extending flanges at the upper edges thereof.

Des Moines, Iowa, November 13, 1916.

WILLIAM A. CONWAY.